(12) United States Patent
Peitron et al.

(10) Patent No.: US 8,788,159 B1
(45) Date of Patent: Jul. 22, 2014

(54) TRANSMISSION GEAR SHIFT CONTROL

(71) Applicant: Ford Global Technology Operations, LLC, Dearborn, MI (US)

(72) Inventors: Gregory Michael Peitron, Canton, MI (US); Sarah M. Thornton, Sacramento, CA (US); Diana Yanakiev, Birmingham, MI (US); James William Loch McCallum, Ann Arbor, MI (US); Anuradha Annaswamy, W. Newton, MA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/766,829

(22) Filed: Feb. 14, 2013

(51) Int. Cl.
*G06F 7/00* (2006.01)
*F16H 61/00* (2006.01)
*G06F 17/00* (2006.01)
*F16H 61/26* (2006.01)

(52) U.S. Cl.
CPC .................... *F16H 61/0021* (2013.01)
USPC ................ 701/51; 477/154; 477/156; 701/55

(58) Field of Classification Search
USPC .................. 701/51, 55; 477/154, 156
See application file for complete search history.

(56) References Cited

U.S. PATENT DOCUMENTS

| | | | | |
|---|---|---|---|---|
| 5,646,842 | A | * | 7/1997 | Schulz et al. ................... 701/51 |
| 5,758,302 | A | * | 5/1998 | Schulz et al. ................... 701/51 |
| 5,919,244 | A | * | 7/1999 | Danz et al. ...................... 701/57 |
| 6,115,661 | A | * | 9/2000 | Hosseini et al. ................ 701/51 |
| 6,149,547 | A | * | 11/2000 | Oba et al. ...................... 477/154 |
| 7,010,405 | B2 | * | 3/2006 | Furuichi et al. ................. 701/51 |
| 7,160,225 | B2 | * | 1/2007 | Berger et al. ..................... 477/5 |
| 7,287,443 | B2 | * | 10/2007 | Kuhstrebe et al. .............. 74/335 |
| 7,527,578 | B2 | * | 5/2009 | Soliman et al. ............... 477/143 |
| 8,585,551 | B2 | * | 11/2013 | Choby ......................... 477/120 |
| 2011/0054747 | A1 | * | 3/2011 | Dohi et al. ...................... 701/55 |
| 2011/0224855 | A1 | * | 9/2011 | Schneider et al. .............. 701/22 |

* cited by examiner

*Primary Examiner* — Thomas G Black
*Assistant Examiner* — Tyler Paige
(74) *Attorney, Agent, or Firm* — James Dottavio; MacMillan, Sobanski & Todd, LLC

(57) ABSTRACT

A method for controlling pressure applied to a displaceable piston in a cylinder, piston displacement actuating a control element of an automatic transmission during a gearshift, includes determining whether piston displacement exceeds a free length of an isolation spring located between the piston and a friction plate of the control element; calculating the pressure using A the cross-sectional area of the piston; K a coefficient of a return spring extending between the piston and a reference position in the cylinder; x the piston displacement; $F_0$ a pre-load of the return spring; $x_{free}$ the free length of the isolation spring; and $K_{is}$ a coefficient of the isolation spring; and applying the calculated pressure to the piston.

17 Claims, 3 Drawing Sheets

TRANSMISSION GEAR SHIFT CONTROL

BACKGROUND OF THE INVENTION

1. Field of the Invention

This invention relates generally to controlling the actuation of a transmission control element actuated by the piston of a hydraulic servo on the basis of the piston's position during a gear shift.

2. Description of the Prior Art

Knowing input shaft torque or output shaft torque is considered beneficial for improving the quality of gear shift control of an automatic transmission for a vehicle. Measurement of input shaft torque or output shaft torque allows feedback control that is more robust to unknown disturbances to be utilized. However, the conventional approach of error-based closed-loop (CL) control has limited authority during fast transients in the torque-transfer phase of a gearshift due to the clutch actuators' considerable nonlinearity, delay and lag.

A method for determining clutch torques during a gearshift using references to input and output shaft torque measurements or estimates, providing multiple opportunities for improving shift control exist. While the off-going clutch torque signal and on-coming clutch torque signal provide valuable feedback, essential for changing the whole paradigm of synchronous torque transfer control, that feedback is still not available during the initial phases of clutch actuation.

The clutch has torque carrying capacity only after certain nonlinear dynamic transients in the clutch actuator take place and, unfortunately, there is no feedback information during that transient response. To be able to command the clutch actuator during those initial phases in a robust fashion, knowledge of the internal state of the actuator would be essential.

SUMMARY OF THE INVENTION

A method for controlling pressure applied to a displaceable piston in a cylinder, piston displacement actuating a control element of an automatic transmission during a gearshift, includes determining whether piston displacement exceeds a free length of an isolation spring located between the piston and a friction plate of the control element; calculating the pressure using A the cross-sectional area of the piston; K a coefficient of a return spring extending between the piston and a reference position in the cylinder; x the piston displacement; $F_0$ a pre-load of the return spring; $x_{free}$ the free length of the isolation spring; and $K_{is}$ a coefficient of the isolation spring; and applying the calculated pressure to the piston.

The method provides internal estimates of the clutch state based on the existing command and feedback signals including clutch torque estimate. Executing the method on-board in real time is simple, unlike existing high-fidelity simulation models. In order to predict adequately the transients in the clutch body in non-nominal conditions, the method captures the dominant physical phenomena governing the movement of the clutch piston.

The availability of the clutch torque signal in region 3, allows online adaptation of the clutch model parameters, to ensure better representation of region 1 and 2 transients in subsequent shifts. However, the need to use and adapt "boost duration" is eliminated and the adaptation of "stroke pressure" can occur during the gearshift, rather than after the gearshift.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
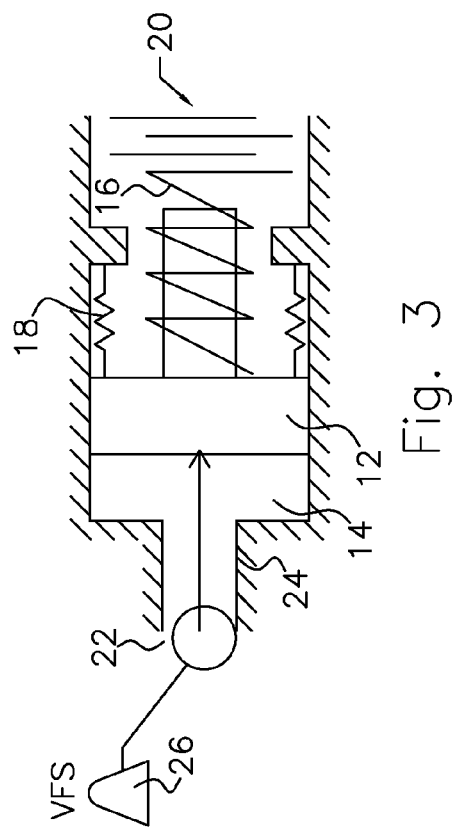
FIGS. 1-4 are schematic diagrams showing clutch displacement in various regions.

FIG. 1 provides insight about a conventional hydraulically-actuated clutch 20 used in an automatic transmission. The clutch piston 12, located in a hydraulic cylinder 14, is being pushed rightward by the hydraulic pressure supplied to the cylinder. Piston 12 first compresses two springs 16, 18 as it moves rightward to compress the friction plates of clutch 20. The outer return spring 18 is preloaded and pushes the piston 12 away from the plates of clutch 20 when the clutch is commanded open. The inner, isolation or cushion spring 16 is optional and it provides resistance to the piston 12 touching the plates in the initial stage of that transient.

Actuation of piston 12 is divided into four regions according to the position of the clutch piston position. In region 1 illustrated in FIG. 1, the clutch piston 12 is at its maximum distance $X_{max}$ from the friction plates of clutch 20. Transmission fluid pressurizes the lines and overcomes the pre-load of return spring 18, while the isolation spring 16 is uncompressed.

Figure 2:
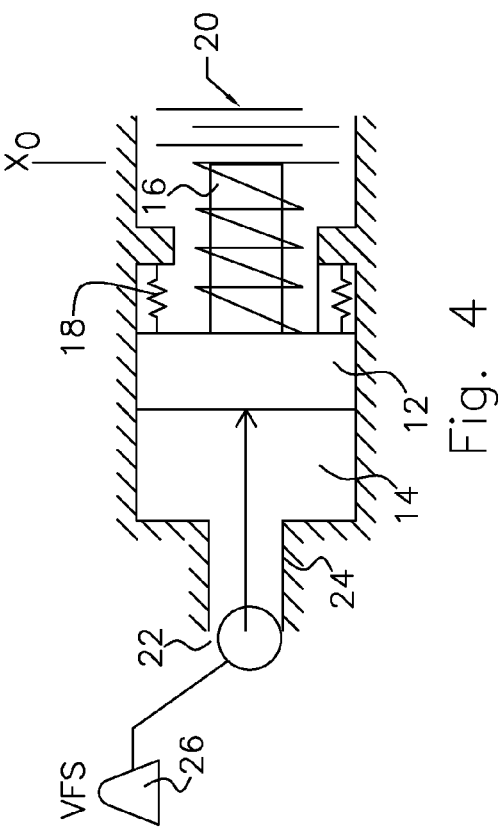

In region 2 illustrated in FIG. 2, transmission fluid fills the clutch cylinder 14 and moves the clutch piston 12 rightward while compressing the return spring 18.

Figure 3:
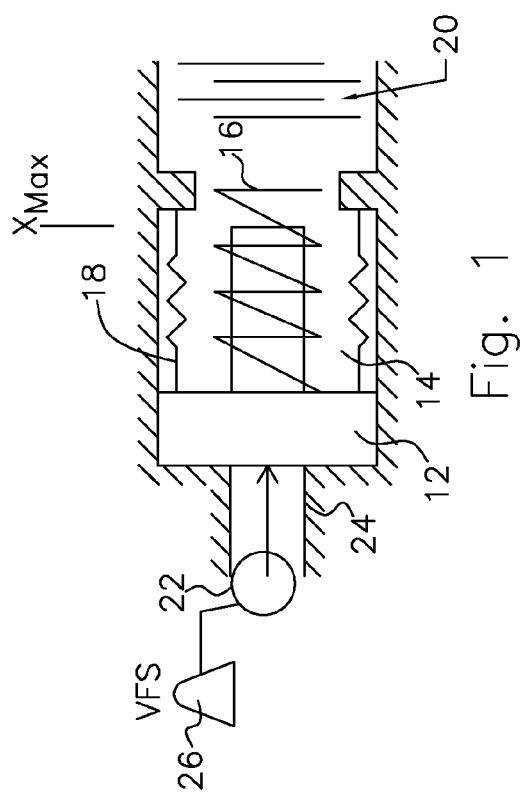

In region 3 illustrated in FIG. 3, transmission fluid continues to fill the clutch cylinder 14. The isolation spring 16 compresses against the friction plates of clutch 20 as the clutch piston 12 continues moving rightward. The torque transfer phase of the gearshift begins and the clutch gains some torque transmitting capacity as the friction plates begin to engage mutually.

Figure 4:
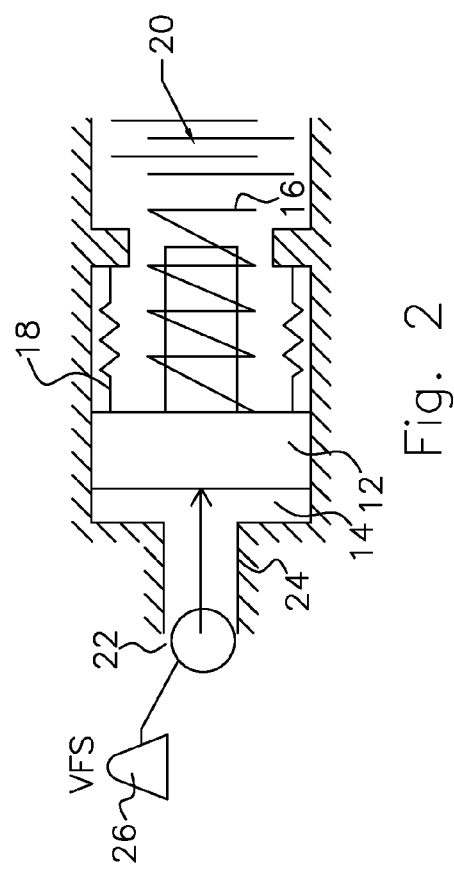

In region 4 illustrated in FIG. 4, the clutch piston 12 stops traveling and touches the leftmost friction plate of clutch 20 when the clutch plates are in mutual contact. Clutch torque capacity increases as the friction plates continue engaging. The clutch pressure and torque capacity can be related linearly here. Within region 4, the torque transfer phase of the gearshift ceases and the inertia transfer phase of the gearshift occurs.

Although reference is made to the transmission control element being a clutch, the control element may be a brake. A clutch alternately connects and disconnects rotating members of the transmission, whereas a brake alternately connects and disconnects a rotating member of the transmission to a non-rotating component such as a transmission housing.

The off-going clutch control and on-coming clutch control during synchronous gearshifts has no on-board sensing that provides feedback about the response of those clutches before the gearbox speed measurements start changing. For a synchronous power-on upshift, for example, there is no feedback during the initial actuation of the clutches and through the torque transfer phase of the gearshift. Only after the speed ratio change commences at some time during region 4, is the real-time controller able to issue its commands based on feedback information.

With the introduction of torque measurement or estimation, that problem is alleviated, since clutch torque feedback is available as soon as the on-coming clutch starts gaining torque capacity, i.e., at the beginning of region 3, as described above. Even then, since shaft twist can be greatly affected by powertrain-induced or external disturbances, the linear relationship between clutch actuation and the torque signal may not be consistent instantaneously.

Line pressurization and return spring compression during regions 1 and remain without any feedback. It is evident from the balance of forces that, if the hydraulic pressure applied to piston 12 is not sufficient to overcome the force of return spring 18, the clutch 20 can remain in the first or second region indefinitely. However, if too much pressure is applied, the piston 12 can progress too rapidly to engage the clutch plates and significant disturbance to the driveline can occur. Hence, knowing the pressure that results in the beginning of region 3, commonly referred as "stroke" pressure, is key. While stroke pressure would be constant for the ideal case of no part-to-part or environmental variations, in reality stroke pressure varies. Stroke pressure is one of the important parameters that a transmission controller would try to adapt. Unfortunately, speed (or even pressure, if that were available) feedback signals do not provide opportunity to adjust that in time to avoid a bad gearshift.

Another factor in the control strategy can be introduced with the so-called "boost phase." Boost is commonly employed to speed the response in the initial phases (regions 1 and 2), by commanding a higher pressure at the solenoid actuator until the clutch pressure gets close to "stroke" pressure. Since neither stroke pressure nor measured actual pressure at the piston 12 are known, the boost phase duration is a calibrated parameter that is adapted from shift-to-shift. Again, the wrong boost duration can cause a bad shift, without the opportunity to correct as it happens.

A production-suitable magneto-elastic shaft torque sensor has been developed and is described in U.S. Patent Application Publication Number 2012/0297895, which is assigned to the assignee of the present patent application, the entire disclosure of which is incorporated herein by reference. That torque sensor's ability to measure torque directly at the transmission input or output shaft enables many features in vehicle control. Its dynamic response is within a fraction of a millisecond and its accuracy is far superior to any currently available on-board torque estimates. The clutch torque calculation based on these torque measurements or estimates is described in U.S. Patent Application Publication Number 2010/0318269, the entire disclosure of which is incorporated herein by reference. This clutch torque determination would provide feedback signal about the clutch actuation as soon as the beginning of region 3.

The clutch model determines the movement of piston 12 as a result of the force balance between the pressure in cylinder 14, and the forces of springs 16, 18. This transient spans regions 2 and 3 in FIG. 1. The initial pressurization in region 1 can be successfully captured with a system identification model, as well as the fast-dynamics in region 4, which has additional feedback information.

The availability of the clutch torque signal in region 3, allows online adaptation of the clutch model parameters, to ensure better representation of region 1 and 2 transients during subsequent shifts. However, the need to use and adapt "boost duration" is eliminated and the adaptation of "stroke pressure" can occur during the gearshift, rather than after the gearshift.

Physical Model Description

Regions 2 and 3 define the part of the clutch actuation wherein the piston 12 moves between the bounds of $x_{max}$ and $x_0$. As FIG. 1 shows, the origin of piston displacement xo is located at the right-hand side of cylinder 14 with each plate of the control element 20 touching another plate of the control element. The maximum piston displacement xmax is shown in FIG. 1. Using Newtonian dynamics to model the clutch piston movement, we have if$(x \leq x_{free})$ $x_{contact} = 1$ else $x_{contact} = 0$ end $$\ddot{x} = \frac{1}{m}(PA + Kx - F_0 - x_{contact}(x_{free} - x)K_{is} - c\dot{x}), \quad (1)$$

wherein x is the clutch piston acceleration, m is the mass of the clutch piston 12, P is the pressure in cylinder 14, A is the cross-sectional area of the clutch apply piston 12, K is the coefficient of return spring 18, x is the clutch piston position, $F_0$ is the pre-load of return spring 18, $x_{conact}$ is 0 or 1 depending on whether the clutch piston 12 is in region 2 or region 3, $x_{free}$ is the height or free length of the isolation spring 16, $K_{is}$ is the coefficient of isolation of spring 18, c is the damping coefficient, and x is the clutch piston velocity.

However, we assume the flow of the transmission fluid through the clutch body is quasi-static. Thus, $\ddot{x}$ and $\dot{x}$ are small, and Eq. (1) becomes $$P = \frac{1}{A}(F_0 - Kx + x_{contact}(x_{free} - x)K_{in}) \quad (2)$$

Note that when $x = x_{max}$, $$P = \frac{1}{A}(F_0 - Kx) \quad (3)$$

and when $x = x_0$, $$P = \frac{1}{A}(F_0 + x_{free}K_{is}) \quad (4)$$

Equations (3) and (4) become the lower bound and upper bound, respectively, of the model output pressure for regions 2 and 3, which can be used to help tune the initial model parameters.

To relate the control input, u, to the model output pressure, P, we choose the clutch piston position, x, as the state. The clutch piston position is modeled using a flow equation of the pressure drop between a regulator valve 22 and the clutch 20. The regulator valve 22 is located on the hydraulic line 24 between a variable force solenoid 26, which provides the commanded pressure, and clutch 10. Assuming there is no saturation of the regulator valve, we have $$\Delta P = u - P \quad (5)$$

$$Q = K_1 \Delta P + K_2 \sqrt{\Delta P} \quad (6)$$

$$x = x_{max} - \frac{1}{A} \int Q dt \quad (7)$$

wherein $\Delta P$ is the difference in commanded and output pressure, Q is the flow rate, $K_1$ is the laminar flow coefficient, and $K_2$ is the turbulent flow coefficient.

The flow coefficients are most suitable for tuning the model, since the other model parameters are geometric. As $K_1$ and $K_2$ vary, the desired output response is tuned. For example, in the case of mostly laminar flow, or low $\Delta P$, the flow coefficients may be chosen to be relatively slow. Also, the difference between $K_1$ and $K_2$ should be considered in order to tune the duration the model is within region 2 or region 3.

Example Algorithms (Model) Description

Region 1.

For the first region, if the clutch piston 12 were held at its maximum position and pressure were allowed to build up to a commanded step input, the output pressure would be a second order response. However, the clutch piston moves once the hydraulic pressure overcomes the pre-load of the return spring. As a result, the second order response is interrupted and the actual response for this region looks like an unstable first order response. Since a dynamic model of the true region 1 response would be difficult to tune and align for the initial condition of region 2, we assume the region 1 model to be constant, and defined as $$P \equiv \text{constant} = \frac{1}{A}(F_0 - K * x_{max}) \quad (9)$$

The duration of region 1 was found to be dependent on the temperature of the transmission fluid.

Region 2.

Using the condition from Eq. (1), $x_{contact} = 0$, and Eq. (2) becomes $$P = \frac{1}{A}(F_0 - Kx) \quad (10)$$

Region 3.

Again, using the condition from Eq. (1), $x_{contact} = 1$, and Eq. (2) becomes $$P = \frac{1}{A}(F_0 + K_{is}x_{free} - (K + K_{is})x), \quad (11)$$

wherein x is defined by Eq. (7).

Region 4.

Once the clutch piston no longer travels, the dynamics of the hydraulic actuation system are no longer present. The pressure response to command is almost instantaneous, and can be represented with a first order transfer function featuring a time constant $T_p$ and a time delay $T_d$.

$$\frac{P}{u}(s) = \frac{1}{1 + T_p s} \exp - T_d s \quad (8)$$

wherein x is defined by Eq. (7).

Figure 5:
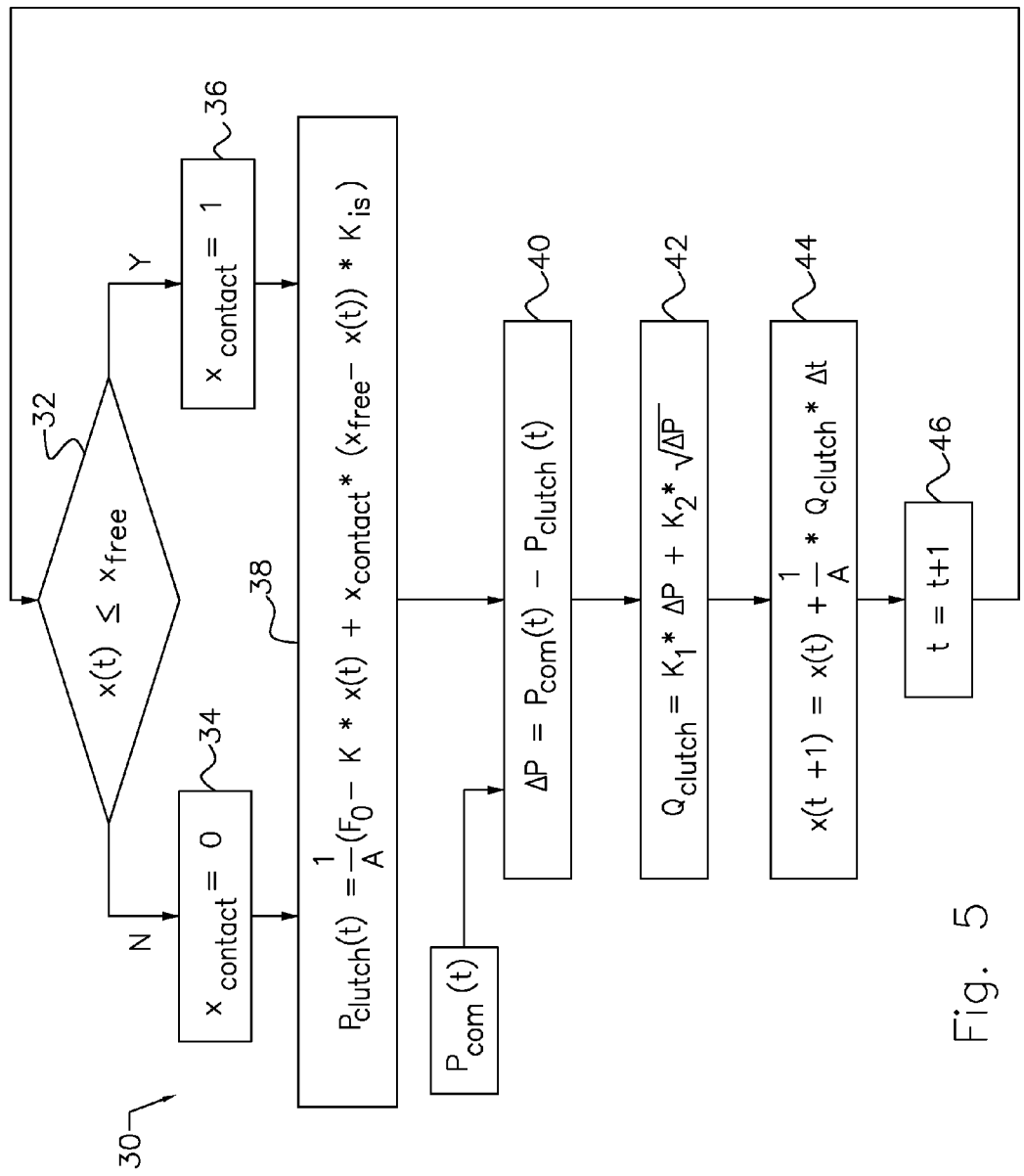
FIG. 5 is a logic diagram of an algorithm applicable to region 2 and 3.

The control algorithm 30 shown in FIG. 5 performs a test at step 32 to determine whether the piston displacement x(t) during the current execution of the algorithm x(t) is equal to or less than xfree. During the first execution of the algorithm x(t) is initialized to xmax.

If the result of test 32 is false, control advances to step 34 where xcontact is set equal to 0. Otherwise, at step 36 xcontact is set equal to 1.

At step 38 the magnitude of pressure in cylinder 14 that actuates piston 12 is calculated using equation (2).

At step 40 equation (5) is used to calculate $\Delta P$. P com (t) is determined by a closed-loop controller on the basis of x(t).

At step 42 the flow rate of hydraulic fluid into cylinder 14 is calculated using equation (6).

At step 44 piston displacement is incremented by adding a magnitude of piston displacement calculated using equation (7) to the current piston displacement.

At step the number of the algorithm execution is incremented, and control returns to step 32.

Figure 6:
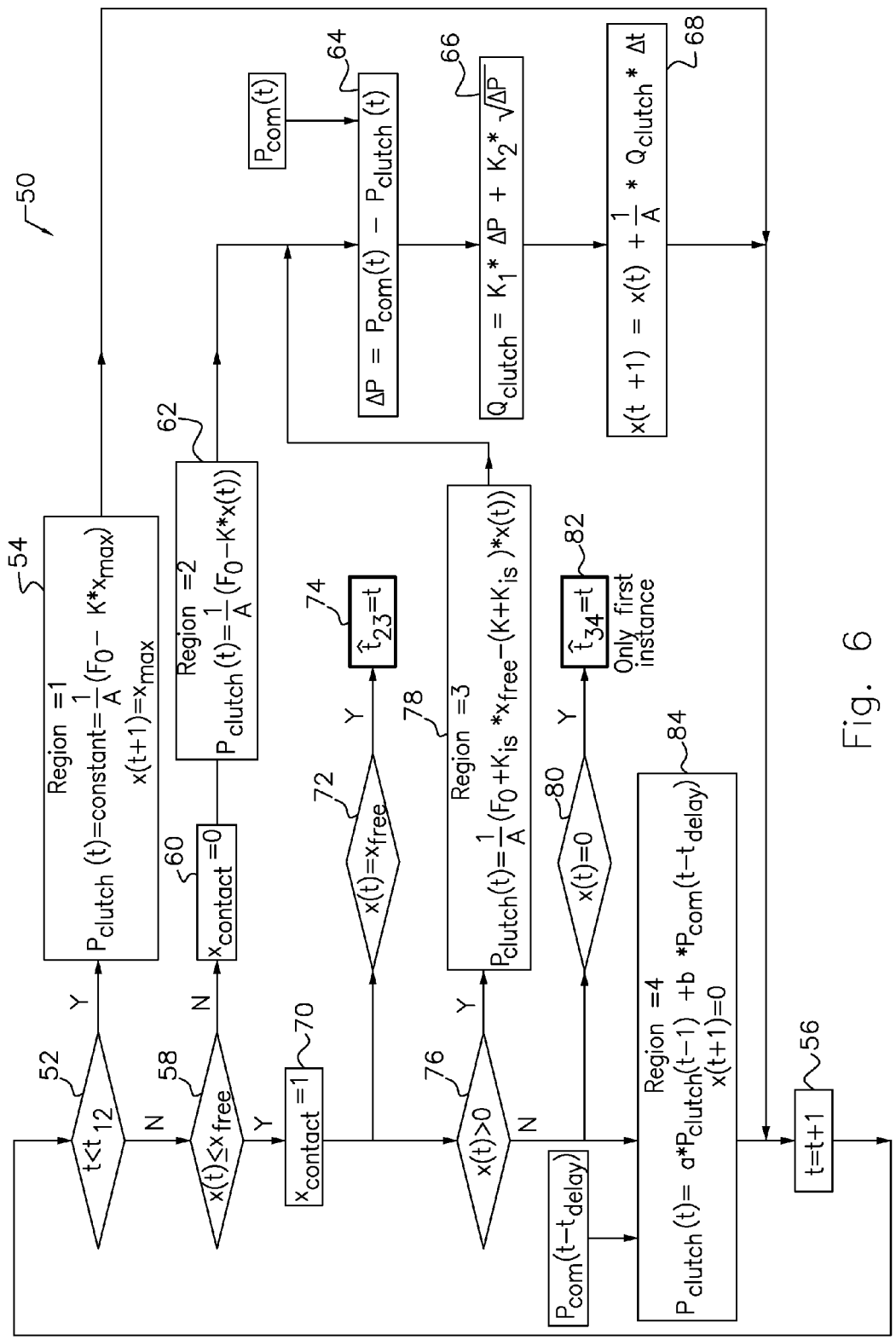
FIG. 6 is a logic diagram of an algorithm applicable to regions 1-4.

The control algorithm 50 shown in FIG. 6 performs a test at step 52 to determine whether (t) is less than the time required for piston 12 to move into region 2 from region 1. A look-up table indexed by hydraulic fluid (ATF) temperature indicates the magnitude of t12

If the result of test 52 is true, at step 54 Pclutch (t) for region 1 is calculated and piston displacement is confirmed to be equal to xmax.

Then control advances to step 56 where t is incremented and control returns to step 52.

If the result of test 52 is false, at step 58 a test is performed to determine whether piston displacement x(t) is equal to or less than xfree.

If the result of test 58 is false, at step 60 xcontact is set equal to zero, and at step 62 Pclutch (t) for region 2 is calculated using equation (2).

Then control advances to step 64 where equation (5) is used to calculate $\Delta$ P. P com (t) is determined closed-loop by a closed-loop controller on the basis of x(t).

At step 66 the flow rate of hydraulic fluid into cylinder 14 is calculated using equation (6).

At step 68 piston displacement x(t) is incremented by adding a magnitude of piston displacement calculated using equation (7) to the current piston displacement.

Then control advances to step 56 where t is incremented and control returns to step 52.

If the result of test 52 is false and the result of test step 58 is true, at step 70 xcontact is set equal to 1.

At step 72 a test is performed to determine whether x(t) is equal to xfree. If the result of test 72 is true, at step 74 an estimate of the time when piston 12 moved from region 2 into region 3 is recorded and stored in electronic memory.

At step 76 a test is performed to determine whether x(t) is greater than zero.

If the result of test 76 is true, at step 78 Pclutch is calculated and control returns to step 64 where equation (5) is used to calculate $\Delta P$. P com (t) is determined closed-loop by a PID controller on the basis of x(t).

At step 66 the flow rate of hydraulic fluid into cylinder 14 is calculated using equation (6).

At step 68 piston displacement x(t) is incremented by adding a magnitude of piston displacement calculated using equation (7) to the current piston displacement.

Then control advances to step 56 where t is incremented again and control returns to step 52.

If the result of test 52 is false, the result of test step 58 is true, and the result of step 76 is false, at step 80 a test is performed to determine whether x(t) is equal to zero.

If the result of test 80 is true, at step 82 an estimate of the time when piston 12 first moved from region 3 into region 4 is recorded and stored in electronic memory.

At step 84, Pclutch (t) is calculated for region 4 using the equation of step 84, which is the discretized time domain version of equation (8), wherein $t_{delay}$ is the period length that passes between the controller issuing Pcom and completing the calculation of Pclutch (t) at step 84 in response to Pcom.

Then control advances to step 56 where t is incremented again and control returns to step 52.

In summary, the pressure output model consists of one state: the clutch piston position, x. The model also has two main tuning parameters, $K_1$ and $K_2$, for the hydraulic actuation. There is also a time delay in the system modeled in Region 4.

In accordance with the provisions of the patent statutes, the preferred embodiment has been described. However, it should be noted that the alternate embodiments can be practiced otherwise than as specifically illustrated and described.

The invention claimed is:

1. A method for controlling pressure applied to a displaceable piston in a cylinder, piston displacement actuating a control element of an automatic transmission during a gearshift, comprising the steps of:
    (a) determining whether piston displacement exceeds a free length of an isolation spring located between the piston and a friction plate of the control element;
    (b) calculating said pressure using A, a cross-sectional area of the piston; K, a coefficient of a return spring extending between the piston and a reference position in the cylinder; x, the piston displacement; $F_0$ a pre-load of the return spring; $x_{free}$ the free length of the isolation spring; and $K_{is}$ a coefficient of the isolation spring;
    (c) applying said calculated pressure to the piston.

2. The method of claim 1, wherein step (a) further comprises:
    comparing the piston displacement to the free length of the isolation spring.

3. The method of claim 1, wherein step (b) further comprises:
    setting $x_{contact}$ equal to 0 provided that the free length of the isolation spring is equal to or greater than the piston displacement;
    setting $x_{contact}$ equal to 1 provided that that the free length of the isolation spring is not equal to or greater than the piston displacement; and
    calculating said pressure from the following equation $$P=1/A(F_0-Kx+x_{contact}(x_{free}-x)K_{is}).$$

4. The method of claim 1, further comprising:
    (d) determining a difference between said calculated pressure and a commanded pressure;
    (e) calculating Q a flow rate of fluid in the cylinder using $K_1$ a laminar flow coefficient; $K_2$ a turbulent flow coefficient; and said difference;
    (f) updating displacement of the piston using the flow rate of fluid in the cylinder, a cross sectional area of the piston, and the length of a period between executing steps (a) and (f).

5. The method of claim 4, wherein step (d) further comprises determining the commanded pressure to be applied to the piston.

6. The method of claim 4, wherein step (e) further comprises calculating Q the flow rate of fluid in the cylinder using the following equation:

$$Q=K_1\Delta P+K_2(\Delta P)^{1/2}$$

wherein $\Delta P$ is the a difference between said calculated pressure and the commanded pressure.

7. The method of claim 4, wherein step (f) further comprises updating displacement of the piston using the following equation:

$$x(t+1)=x(t)+1/A*Q*\Delta t$$

wherein x (t+1) is the updated displacement of the piston, x(t) is an immediately previous displacement of the piston, A is the cross-sectional area of the piston, Q is the flow rate of fluid in the cylinder, and $\Delta t$ is the length of said period.

8. The method of claim 1, wherein step (b) further comprises calculating said pressure from the following equation provided that piston displacement is greater than $x_{free}$: $P=1/A(F_0-Kx)$.

9. The method of claim 1, wherein step (b) further comprises calculating said pressure from the following equation provided that piston displacement is between $x_{free}$ and zero:

$$P=1/A(F_0-Kx+(x_{free}-x)K_{is})$$

10. A method for controlling pressure applied to a displaceable piston in a cylinder, piston displacement actuating a control element of an automatic transmission during a gearshift, comprising the steps of:
    (a) determining the displacement of the piston, and controlling the pressure based at least in part on a calculated piston displacement;
    (b) determining whether piston displacement exceeds at least one of: a free length of an isolation spring located between the piston and a friction plate of the control element, and a free length of a return spring located between the piston and a non-axial moving member;
    (c) calculating estimated pressure using A, a cross-sectional area of the piston; K, a coefficient of a return spring extending between the piston and a reference position in the cylinder; x, the piston displacement; $F_0$ a pre-load of the return spring; $x_{free}$ the length of the isolation spring; xmax, this maximum displacement of the piston, and $K_{is}$ a coefficient of the isolation spring;
    (d) applying the estimated pressure to the piston.

11. The method of claim 10, wherein step (a) further comprises:
    comparing the piston displacement to the free length of the isolation spring.

12. The method of claim 10, wherein step (b) further comprises:
    setting $x_{contact}$ equal to 0 provided that the free length of the isolation spring is equal to or greater than the piston displacement;
    setting $x_{contact}$ equal to 1 provided that that the free length of the isolation spring is not equal to or greater than the piston displacement; and
    calculating said pressure from the following equation $$P=1/A(F_0-Kx+x_{contact}(x_{free}-x)K_{is}).$$

13. The method of claim 10, further comprising:
    (d) determining a difference between said calculated pressure and a commanded pressure;

(e) calculating Q a flow rate of fluid in the cylinder using $K_1$ a laminar flow coefficient; $K_2$ a turbulent flow coefficient; and said difference;

(f) updating displacement of the piston using the flow rate of fluid in the cylinder, a cross sectional area of the piston, and the length of a period between executing steps (a) and (f).

14. The method of claim 13, wherein step (e) further comprises calculating Q the flow rate of fluid in the cylinder using the following equation:

$$Q=K_1 \Delta P+K_2(\Delta P)^{1/2}$$

wherein $\Delta P$ is the a difference between said calculated pressure and the commanded pressure.

15. The method of claim 13, wherein step (f) further comprises updating displacement of the piston using the following equation:

$$x(t+1)=x(t)+1/A*Q*\Delta t$$

wherein x (t+1) is the updated displacement of the piston, x(t) is an immediately previous displacement of the piston, A is the cross-sectional area of the piston, Q is the flow rate of fluid in the cylinder, and $\Delta t$ is the length of said period.

16. The method of claim 10, wherein step (b) further comprises calculating said pressure from the following equation provided that piston displacement is greater than $x_{free}$: $P=1/A (F_0-Kx)$.

17. The method of claim 10, wherein step (b) further comprises calculating said pressure from the following equation provided that piston displacement between $x_{free}$ and zero:

$$P=1/A(F_0-Kx+(x_{free}-x)K_{is}).$$

* * * * *

UNITED STATES PATENT AND TRADEMARK OFFICE
CERTIFICATE OF CORRECTION

| | | |
|---|---|---|
| PATENT NO. | : 8,788,159 B1 | Page 1 of 1 |
| APPLICATION NO. | : 13/766829 | |
| DATED | : July 22, 2014 | |
| INVENTOR(S) | : Gregory Michael Pietron et al. | |

It is certified that error appears in the above-identified patent and that said Letters Patent is hereby corrected as shown below:

Title Page of Patent, Item (12) "Peitron et al." should read -- Pietron et al. --.

Title Page of Patent, Item (72), Inventor(s) Listing:

The Inventor, "Gregory Michael Peitron, Canton, MI (US)" should read
-- Gregory Michael Pietron, Canton, MI (US) --.

Signed and Sealed this
Eighteenth Day of November, 2014

Michelle K. Lee
*Deputy Director of the United States Patent and Trademark Office*